(12) United States Patent
Aso

(10) Patent No.: US 11,826,838 B2
(45) Date of Patent: Nov. 28, 2023

(54) CUTTING TOOL

(71) Applicant: TUNGALOY CORPORATION, Fukushima (JP)

(72) Inventor: Takahiro Aso, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/854,892

(22) Filed: Jun. 30, 2022

(65) Prior Publication Data

US 2023/0067692 A1 Mar. 2, 2023

(30) Foreign Application Priority Data

Aug. 30, 2021 (JP) .................................. 2021-140139

(51) Int. Cl.
*B23C 5/28* (2006.01)
*B23C 5/10* (2006.01)

(52) U.S. Cl.
CPC .............. *B23C 5/1081* (2013.01); *B23C 5/28* (2013.01); *B23C 2210/40* (2013.01)

(58) Field of Classification Search
CPC ........... B23C 5/28; B23C 5/282; B23C 5/287; B23B 27/10; B23B 27/12; B23B 51/042; B23B 51/06; B23B 51/063; B23B 51/068; B23B 51/0686; B23B 2250/12; B23B 2250/121
See application file for complete search history.

(56) References Cited

U.S. PATENT DOCUMENTS

| | | | | |
|---|---|---|---|---|
| 5,290,135 A | * | 3/1994 | Ball | B23Q 11/10 407/11 |
| 5,947,653 A | * | 9/1999 | Hamberg | B23B 51/0493 408/230 |
| 8,439,609 B2 | * | 5/2013 | Woodruff | B23C 5/109 407/11 |
| 10,010,948 B1 | * | 7/2018 | Hayden | B23P 15/32 |
| 10,556,278 B2 | * | 2/2020 | Fraese | B23C 5/2208 |
| 2008/0131216 A1 | * | 6/2008 | Sasu | B23C 5/28 407/113 |
| 2012/0141220 A1 | * | 6/2012 | Chen | B23B 31/11 409/136 |
| 2015/0063931 A1 | * | 3/2015 | Wu | B23B 51/0493 408/59 |

FOREIGN PATENT DOCUMENTS

| | | | | |
|---|---|---|---|---|
| AT | 7296 U1 | * | 1/2005 | ........... B23B 27/145 |
| CN | 105750598 A | * | 7/2016 | ............. B23B 51/00 |
| CN | 109352055 A | * | 2/2019 | ........... B23C 5/2204 |
| DE | 10145006 A1 | * | 4/2003 | ............... B23C 5/08 |

(Continued)

*Primary Examiner* — Nicole N Ramos
(74) *Attorney, Agent, or Firm* — Studebaker & Brackett PC

(57) ABSTRACT

A cutting tool includes a grip part and a cutting part. In the grip part and the cutting part, a channel for guiding fluid supplied from the outside to an outflow port is formed. The channel includes: a first channel extending in parallel to a rotational center axis and linearly from an end part of the grip part on an opposite side to the cutting part; and a second channel extending linearly from the first channel toward a cutting edge of a cutting insert. The first channel is formed such that a center axis thereof is decentered so as not to match the rotational center axis.

6 Claims, 13 Drawing Sheets

(56) References Cited

FOREIGN PATENT DOCUMENTS

| | | | |
|---|---|---|---|
| EP | 0768136 A1 | 4/1997 | |
| EP | 2554310 A2 * | 2/2013 | ............ B23C 5/109 |
| EP | 3875196 A1 * | 9/2021 | |
| GB | 2501511 A * | 10/2013 | ............ B23B 27/10 |
| JP | 2000-005923 A | 1/2000 | |
| JP | 2010-234457 A | 10/2010 | |
| JP | 2016-068172 A | 5/2016 | |
| KR | 101014122 B1 * | 2/2011 | |
| WO | WO-2018010706 A1 * | 1/2018 | |

* cited by examiner

CUTTING TOOL

BACKGROUND OF THE INVENTION

Field of the Invention

The present invention relates to a cutting tool.

Description of Related Art

A cutting tool used for machining of metals includes a grip part that is a part gripped by a machine tool such as a milling machine and a cutting part that is a part provided with a cutting edge. The machine tool brings the cutting edge of the cutting part into contact with a workpiece such as metal while rotating the entire cutting tool in the state of gripping the grip part, thereby machining the workpiece.

In this case, in general, fluid is supplied to a point, at which the cutting edge and the workpiece contact, (cutting point) or to a vicinity thereof. Such fluid is supplied for the purpose of, for example, discharge of chips, cooling of the cutting tool, cooling of the workpiece, lubrication, and rust-proofing. Note that liquid is used as fluid in many cases, but gas is sometimes used. Fluid is supplied from external nozzles disposed around the cutting tool in some cases, but as disclosed in Patent Publication JP-A-2016-68172, fluid is supplied through a channel formed inside the cutting tool in some cases.

SUMMARY

Fluid is supplied from the machine tool to the cutting tool through a surface of the grip part on a rear end side. Thus, as channels formed in the cutting tool, it is conceivable to form a first channel that extends linearly from the rear end surface along the rotational center axis and a plurality of second channels that extend linearly from the first channel to the cutting edges on the outer peripheral side.

In such a configuration, however, fluid that has passed through the second channel that linearly extends is difficult to directly contact the cutting edge located on the inner side of the chip pocket. In view of the above, in the cutting tool disclosed in Patent Publication JP-A-2016-68172, channels for guiding fluid from the first channel at the center to the cutting edges on the outer peripheral side are formed as channels (second channel and third channel) bent at the intermediate sections, so that fluid is brought into direct contact with the cutting edges.

In such a configuration, however, a complicated step for forming a bent channel is needed, and hence there is a concern over an increase in manufacturing cost.

It is an object of the present invention to provide a cutting tool capable of easily forming a channel toward a cutting edge.

A cutting tool according to one aspect of the present invention includes: a grip part which is a columnar part to be gripped by a machine tool and of which a center axis matches a rotational center axis; a cutting part in which a recessed chip pocket is formed; and a plurality of cutting edges provided to an inner surface of the chip pocket so as to be arranged along a circumferential direction. The grip part and the cutting part have therein a channel for guiding fluid supplied from outside to an outflow port formed in a vicinity of the cutting edge. The channel includes: a first channel extending in parallel to the rotational center axis and linearly from an end part of the grip part on an opposite side thereof to the cutting part; and a second channel extending linearly from the first channel toward the cutting edge. The first channel is formed such that a center axis thereof is decentered so as not to match the rotational center axis.

In the cutting tool having the above-mentioned configuration, the first channel is formed at a position decentered so as not to match the rotational center axis, and hence fluid that has passed through the second channel can be directed to the cutting edge although the entire second channel on the downstream side of the first channel is a linear channel. The second channel is not required to be bent in the middle, and hence a channel toward the cutting edge can be easily formed.

In a further preferred aspect, the first channel may be provided in plurality to be formed.

In a further preferred aspect, a number of the first channels may be smaller than a number of the cutting edges arranged along the circumferential direction.

In a further preferred aspect, the second channel may be provided in plurality, the plurality of second channels being connected to one first channel such that fluid that has passed through the one first channel is supplied to each of the plurality of cutting edges.

In a further preferred aspect, a single recessed part that is retracted toward the cutting part may be formed at an end part of the grip part on an opposite side to the cutting part, and an inflow port that is an inlet of the fluid to the first channel may be formed at a position at which at least a part of the inflow port overlaps the recessed part.

In a further preferred aspect, the recessed part may be formed in a range including the rotational center axis.

In a further preferred aspect, in the cutting part, a plurality of the cutting edges may be provided respectively at a plurality of stage positions arranged in a direction along the rotational center axis so as to be arranged along the circumferential direction.

In a further preferred aspect, a plurality of the second channel may be provided in plurality, the plurality of second channels being connected to one first channel such that the fluid that has passed through the one first channel is supplied toward each of the cutting edges located at a plurality of the stage positions.

In a further preferred aspect, the cutting edge may be a part of a cutting insert mounted to an inner surface of the chip pocket.

In a further preferred aspect, the outflow port that is an outlet of fluid that has passed through the second channel may be formed in an inner surface of the chip pocket, and a position of the outflow port in a direction along the rotational center axis is a position overlapping a range where the cutting insert is provided in the direction.

According to the present invention, a cutting tool capable of easily forming a channel toward a cutting edge is provided.

DETAILED DESCRIPTION

Figure 1:
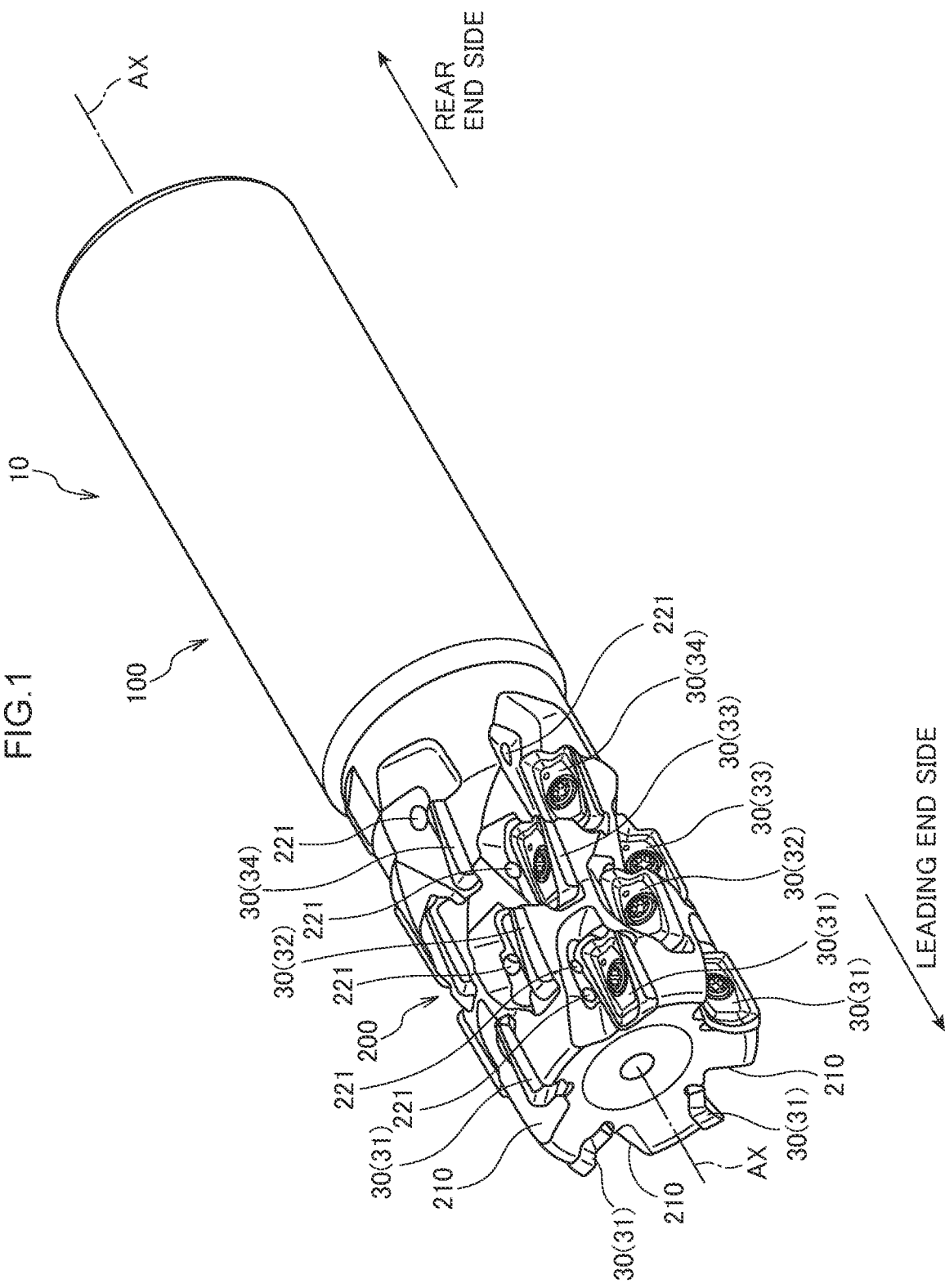
FIG. 1 is a perspective view illustrating a configuration of a cutting tool according to a first embodiment.

Embodiments are described below with reference to the accompanying drawings. To facilitate the understanding of description, the same components in the figures are denoted by the same reference numeral whenever possible, and overlapping descriptions are omitted.

A configuration of a cutting tool 10 according to a first embodiment is described. The cutting tool 10 according to the present embodiment is used while being mounted to a machine tool (not shown) such as a milling machine, and is configured as an endmill of roughing type. As illustrated in FIG. 1, the cutting tool 10 includes a grip part 100 and a cutting part 200.

The grip part 100 is a part what is called "shank", and is a columnar part to be gripped by a machine tool (not shown). The center axis of the grip part 100 matches a rotational center axis AX of rotation of the cutting tool 10. The grip part 100 is a part on one side (part on right side in FIG. 1) of the cutting tool 10 along the rotational center axis AX. The cutting part 200 described next is a part on the other side (part on left side in FIG. 1) of the cutting tool 10 along the rotational center axis AX. A direction toward the grip part 100 along the rotational center axis AX is hereinafter referred to as "rear end side". A direction toward the cutting part 200 along the rotational center axis AX is hereinafter referred to as "leading end side".

The cutting part 200 is a part on which a plurality of cutting inserts 30 are mounted, and is a part for machining a workpiece by the cutting inserts 30. The cutting insert 30 is a replaceable edge fastened and fixed to the cutting part 200. An edge part formed in the leading end of the cutting insert 30 functions as a "cutting edge" for cutting a workpiece. Note that the edge part serving as a cutting edge of the cutting insert 30 may be a leading end of the cutting insert 30 as in the present embodiment, but may be the entire side (that is, range over entire periphery of polygon) of the cutting insert 30. Which part of the cutting insert 30 is used as a cutting edge is not particularly limited.

In the cutting part 200, recessed chip pockets 210 are formed. The chip pocket 210 is formed as a space for receiving chips generated during cutting and discharging the chips to the outside. In the inner surface of the chip pocket 210, a plurality of recessed insert seats (not shown) are formed so as to be arranged along the circumferential direction, and the cutting insert 30 is fastened and fixed to each insert seat. As a result, the plurality of cutting edges of the cutting inserts 30 are arranged along the circumferential direction.

In the present embodiment, the chip pockets 210 in the number corresponding to the number of cutting inserts 30 are formed. In other words, the plurality of chip pockets 210 are also arranged along the circumferential direction similarly to the cutting inserts 30. However, a chip pocket 210 provided with one cutting insert 30 and a chip pocket 210 provided with another cutting insert 30 may be connected to each other.

Figure 2:
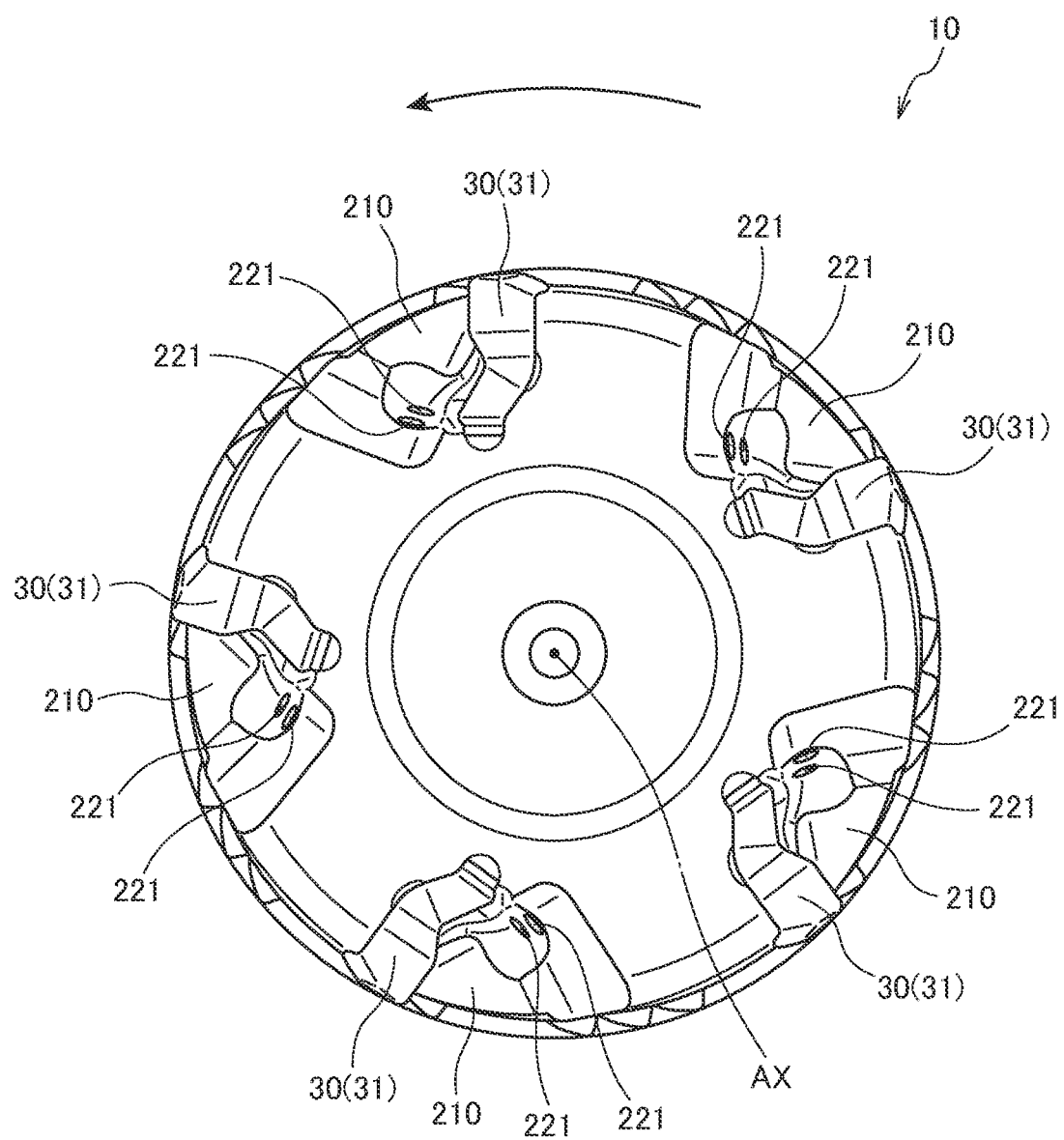
FIG. 2 is a view of the cutting tool according to the first embodiment as seen from a leading end side.

FIG. 2 illustrates the appearance of the cutting part 200 as seen from the leading end side along the rotational center axis AX. As illustrated in FIG. 2, five chip pockets 210 are formed on the leading end side of the cutting part 200 so as to be arranged at equal intervals along the circumferential direction, and the cutting insert 30 is fixed to the inner surface of each chip pocket 210. An arrow illustrated in FIG. 2 indicates a rotational direction of the cutting tool 10 when used. The cutting insert 30 is fixed to a surface that is an end part of the inner surface of the chip pocket 210 on the rearmost side in the rotational direction.

Figure 3:
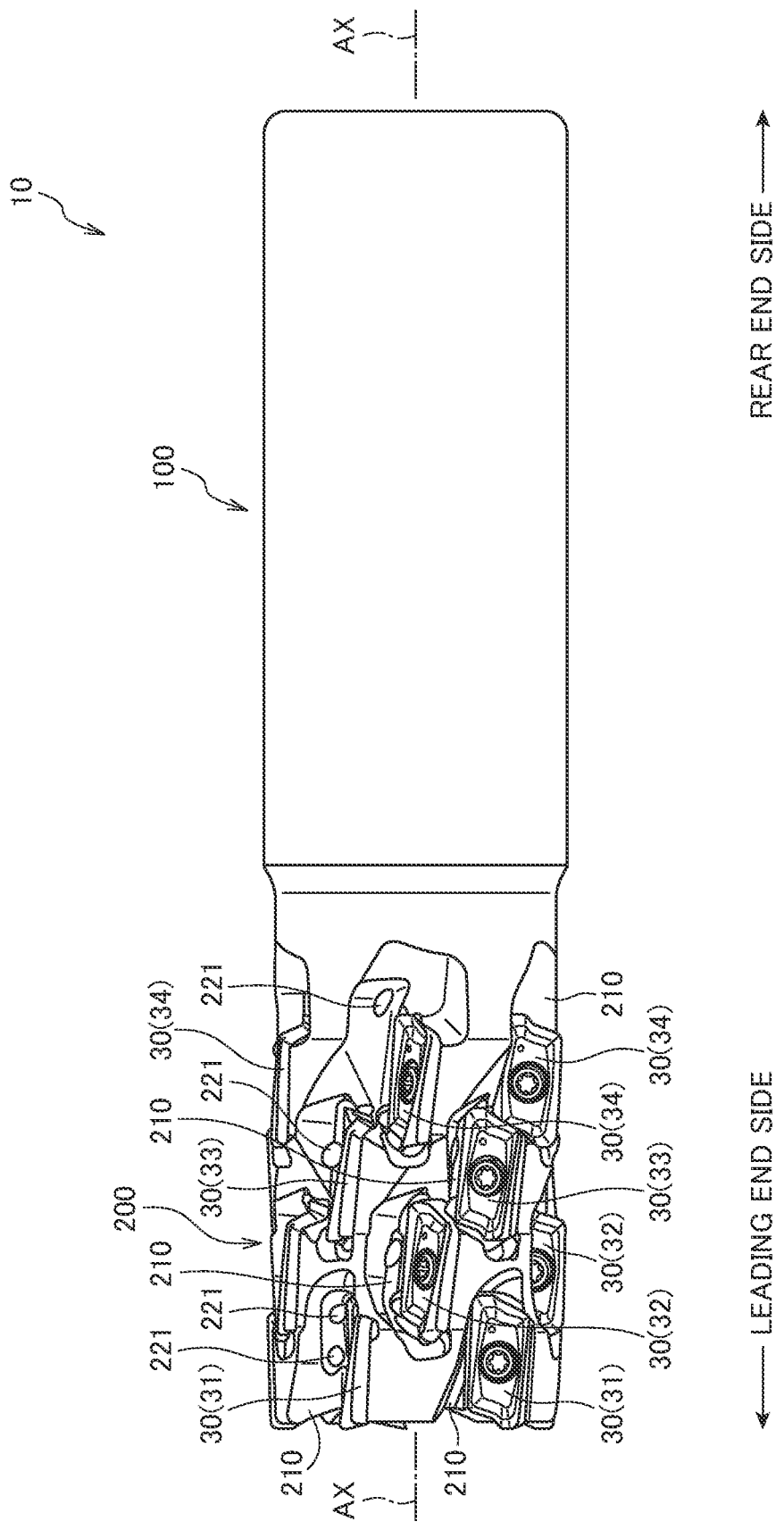
FIG. 3 is a view of the cutting tool according to the first embodiment as seen from the side.

A plurality of chip pockets 210 and a plurality of cutting inserts 30 are provided not only on the leading end side of the cutting part 200 but also on the side surface part of the cutting part 200. The specific arrangement thereof is described with reference to FIG. 3. FIG. 3 illustrates the appearance of the cutting tool 10 as seen from a direction perpendicular to the rotational center axis AX. As illustrated in FIG. 3, in the cutting part 200, a plurality of chip pockets 210 are formed so as to be arranged along the circumferential direction at each of a plurality of stage positions arranged in a direction along the rotational center axis AX, and the cutting inserts 30 are fixed to the respective chip pockets 210. The number of chip pockets 210 formed at each stage position may be different from the number of cutting inserts 30 at the stage position.

At a given stage position, the number of a plurality of cutting inserts 30 arranged along the circumferential direction (five in the present embodiment) is hereinafter sometimes referred to as "number of edges". The total number of cutting inserts 30 provided to the cutting part 200 is calculated as "stage position x number of edges". Note that the numbers of edges may be different among stage positions.

In FIG. 3, the cutting inserts 30 denoted by reference numeral "31" are five cutting inserts 30 arranged along the circumferential direction at a stage position on the farthest leading end side. The cutting inserts 30 denoted by reference numeral "32" are five cutting inserts 30 arranged along the circumferential direction at the second stage position from the leading end side. The cutting inserts 30 denoted by reference numeral "33" are five cutting inserts 30 arranged along the circumferential direction at the third stage position from the leading end side. The cutting inserts 30 denoted by reference numeral "34" are five cutting inserts 30 arranged along the circumferential direction at the fourth stage position from the leading end side, that is, at a stage position on the rearmost end side. The cutting inserts 30 at each stage position are hereinafter sometimes referred to as "cutting insert 31" and "cutting insert 32".

A stage position on the most leading end is hereinafter sometimes referred to as "first stage", and the second stage position from the leading end is hereinafter sometimes referred to as "second stage". Similarly, the third stage position from the leading end is hereinafter sometimes referred to as "third stage", and the fourth stage position from the leading end is hereinafter sometimes referred to as "fourth stage".

As illustrated in FIG. 1 and FIG. 3, an outflow port 221 is formed in the inner surface of each chip pocket 210 at a position near the cutting insert 30. The outflow port 221 is an opening provided in order to supply fluid toward the cutting insert 30. As described later, a channel for guiding fluid supplied from the outside to the outflow port 221 is formed inside the cutting tool 10, and the outflow port 221 is the most downstream end part of the channel.

Note that the above-mentioned "fluid" is supplied from the outside for the purpose of discharge of chips, cooling of the cutting tool, cooling of workpieces, lubrication, and rust-proofing, and is, for example, called "coolant" and "lubricant". The purpose of supply of fluid is not particularly limited. Fluid may be liquid or gas.

Figure 4:
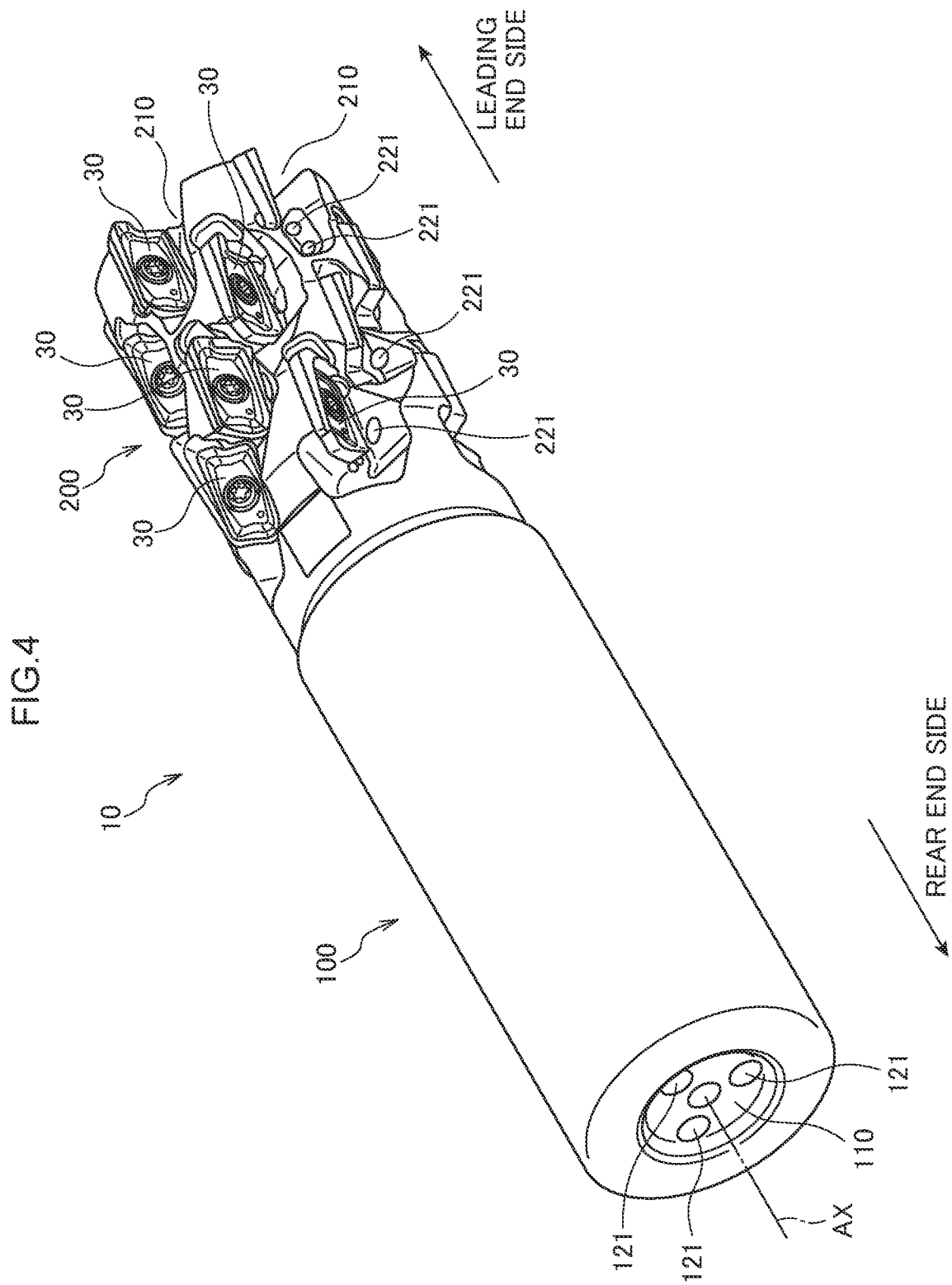
FIG. 4 is a perspective view illustrating a configuration of the cutting tool according to the first embodiment.

As illustrated in FIG. 4, three inflow ports 121 are formed at an end part of the grip part 100 on the side opposite to the cutting part 200, that is, at the rearmost end part. The inflow port 121 is an opening provided as an inlet of the above-mentioned fluid supplied from the outside. In other words, each inflow port 121 is an end part of the above-mentioned channel on the most upstream side. Fluid flows from the inflow port 121 to the channel inside the cutting tool 10, passes through the channel, and is thereafter discharged from the above-mentioned outflow port 221 and supplied to the cutting edge of the corresponding cutting insert 30.

Figure 5:
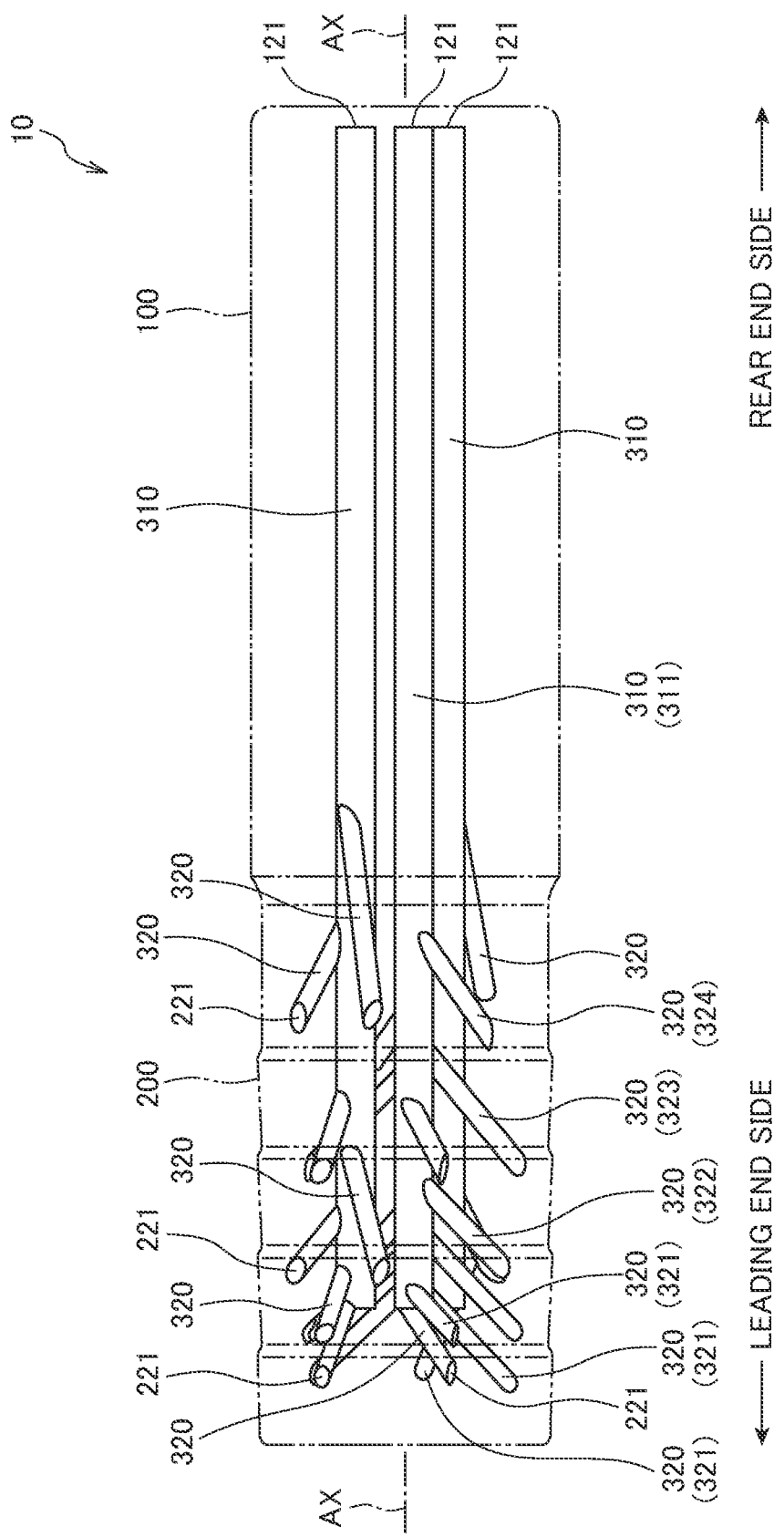
FIG. 5 is a view illustrating a channel formed in the cutting tool according to the first embodiment.
Figure 6:
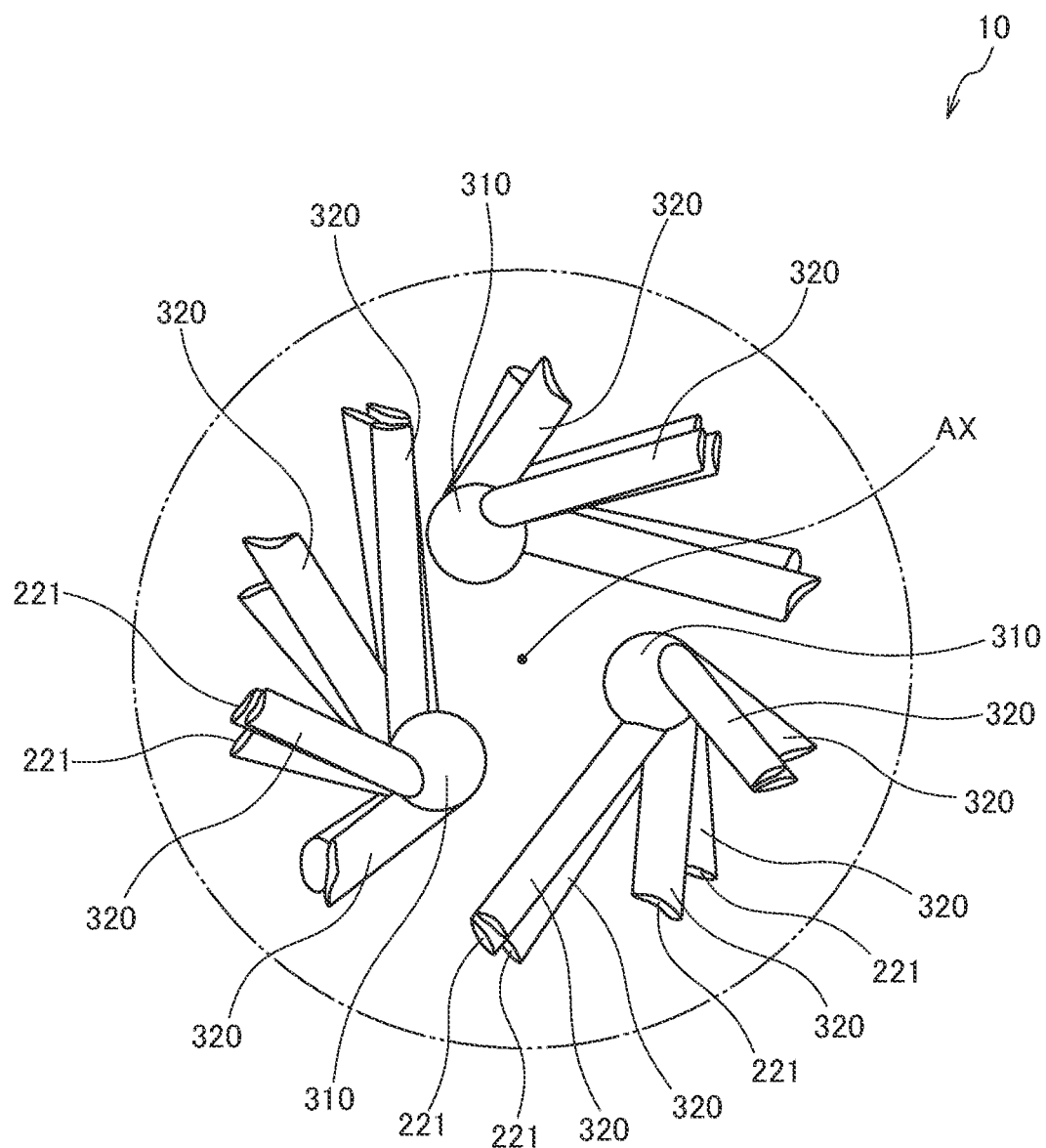
FIG. 6 is a view illustrating a channel formed in the cutting tool according to the first embodiment.

Specific shapes of the channels formed inside the cutting tool 10 are described. FIG. 5 is a view illustrating the shapes of the channels formed inside the cutting tool 10 as seen from the same viewpoint as in FIG. 3. FIG. 6 is a view illustrating the shapes of the channels formed inside the cutting tool 10 as seen from the same viewpoint as in FIG. 2. As illustrated in FIG. 5 and FIG. 6, the above-mentioned channels include first channels 310 and second channels 320.

The first channel 310 is formed so as to extend in parallel to the rotational center axis AX and linearly from a rear end part of the grip part 100 on the side opposite to the cutting part 200. An opening formed in the most upstream end part of the first channel 310 is the inflow port 121 illustrated in FIG. 4. The first channel 310 passes through the entire grip part 100 from the inflow port 121 along the rotational center axis AX, and further extends to a position in the middle of the cutting part 200.

As illustrated in FIG. 6, three first channels 310 are formed. The first channels 310 are each formed such that its center axis is decentered so as not to match the rotational center axis AX, and are formed so as to surround the rotational center axis AX with the same angular intervals. In other words, in the present embodiment, the three first channels 310 are formed at positions different by 120 degrees along the circumferential direction.

The second channel 320 is formed so as to linearly extend from a position in the middle of the first channel 310 toward a corresponding cutting insert 30. A downstream end part of each of the second channels 320 is the outflow port 221 described above, and is an opening formed in the inner surface of each chip pocket 210. One or two outflow ports 221 are formed in the inner surface of each chip pocket 210, and the second channel 320 is formed so as to extend from each outflow port 221 toward any one of the first channels 310.

In the present embodiment, both of the first channel 310 and the second channel 320 are formed as linear channels having circular cross sections. Thus, each channel can be easily formed by drilling. The inner diameter of the second channel 320 is smaller than the inner diameter of the first channel 310.

In FIG. 5, the second channel 320 denoted by reference numeral "321" is a second channel 320 formed so as to extend toward the cutting insert 31 at the first stage. In FIG. 5, the second channel 320 denoted by reference numeral "322" is a second channel 320 formed so as to extend toward the cutting insert 32 at the second stage. In FIG. 5, the second channel 320 denoted by reference numeral "323" is a second channel 320 formed so as to extend toward the cutting insert 33 at the third stage. In FIG. 5, the second channel 320 denoted by reference numeral "324" is a second channel 320 formed so as to extend toward the cutting insert 34 at the fourth stage. These second channels 320 are connected to the common first channel 310 (first channel 310 denoted by reference numeral "311" in FIG. 5). Regarding the other first channels 310, second channels 320 directed to the cutting inserts 30 at each stage position are connected similarly to the above.

As described above, in the cutting tool 10 according to the present embodiment, a plurality of second channels 320 are connected to one first channel 310 such that fluid that has passed through the one first channel 310 is supplied to each of the cutting inserts 30 located at a plurality of stage positions. In such a configuration, the number of first channels 310 is not required to be increased in accordance with the number of stage positions, and hence the inner diameter of the first channel 310 can be sufficiently secured to reduce the channel resistance in the first channel 310.

Note that, in the cutting tool 10 according to the present embodiment, two second channels 320 are directed to each of the cutting inserts 31 at the first stage, and one second channel 320 is directed to each of the cutting inserts 32 at the second and subsequent stages. The reason why the number of second channels 320 directed to the cutting inserts 31 at the first stage is increased is that the fact that processing load on the cutting inserts 31 at the first stage is larger than processing load on other cutting inserts 32 is taken into consideration. The number of second channels 320 directed to the cutting inserts 30 at each stage position may be changed as appropriate.

Figure 7:
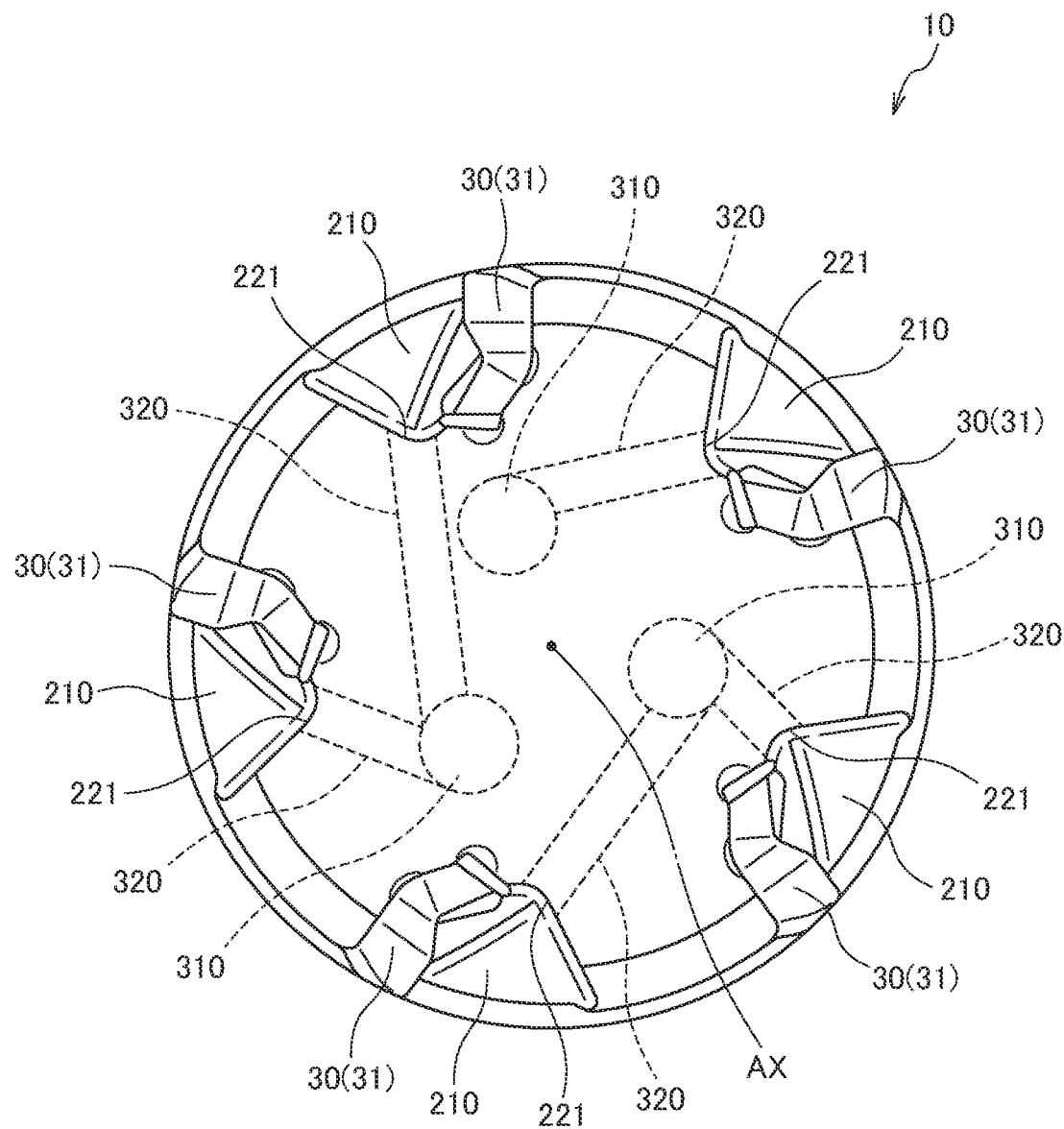
FIG. 7 is a view illustrating a configuration of the cutting tool according to the first embodiment.

FIG. 7 is a view of the cutting part 200 as seen from the leading end side along the rotational center axis AX similarly to FIG. 2. FIG. 7 illustrates first channels 310 and second channels 320 directed to the cutting inserts 31 at the first stage. The illustration of the other second channels 320 is omitted. FIG. 7 schematically illustrates a part of the inner surface of the chip pocket 210 in a simple manner. As illustrated in FIG. 7, when five cutting inserts 31 located at a stage position on the most leading end side are focused, the second channels 320 are formed such that fluid is supplied from one first channel 310 toward one or two cutting inserts 31. In other words, a plurality of second channels 320 are connected to one first channel 310 such that fluid that has passed through the one first channel 310 is supplied to each of a plurality of cutting inserts 31.

Thus, although the number of first channels 310 (three) is smaller than the number of cutting inserts 31 arranged along the circumferential direction at the same stage position, that is, the number of edges (five), fluid can be supplied toward all cutting inserts 31. The same applies to the cutting inserts 32 located at the other stage positions.

In such a configuration, as compared with the case where the same number of first channels 310 as the number of cutting inserts 31 is provided, the inner diameter of the first channel 310 can be increased to reduce the channel resistance in the first channel 310.

Figure 8:
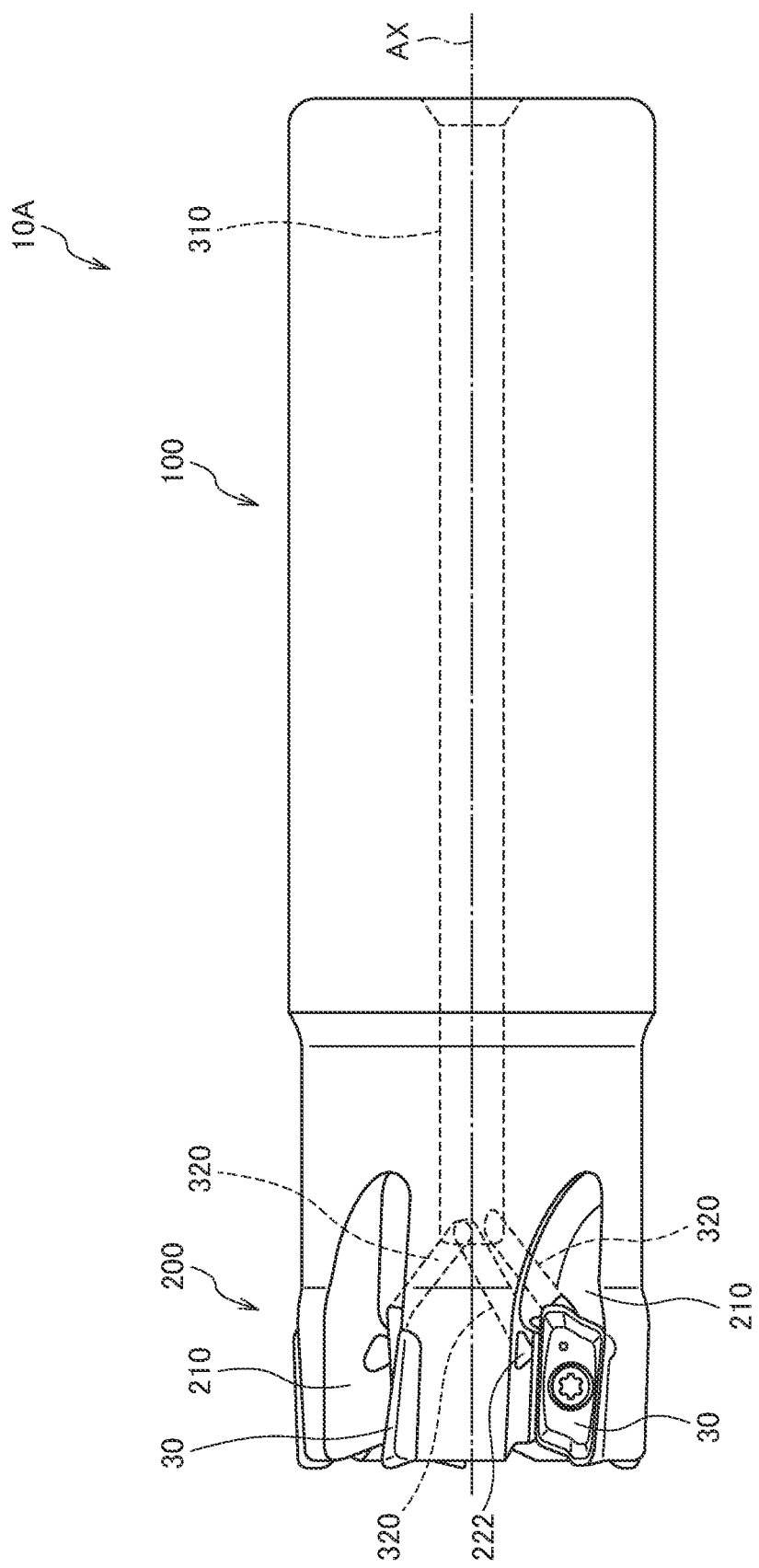
FIG. 8 is a view illustrating a configuration of a cutting tool according to a comparative example.
Figure 9:
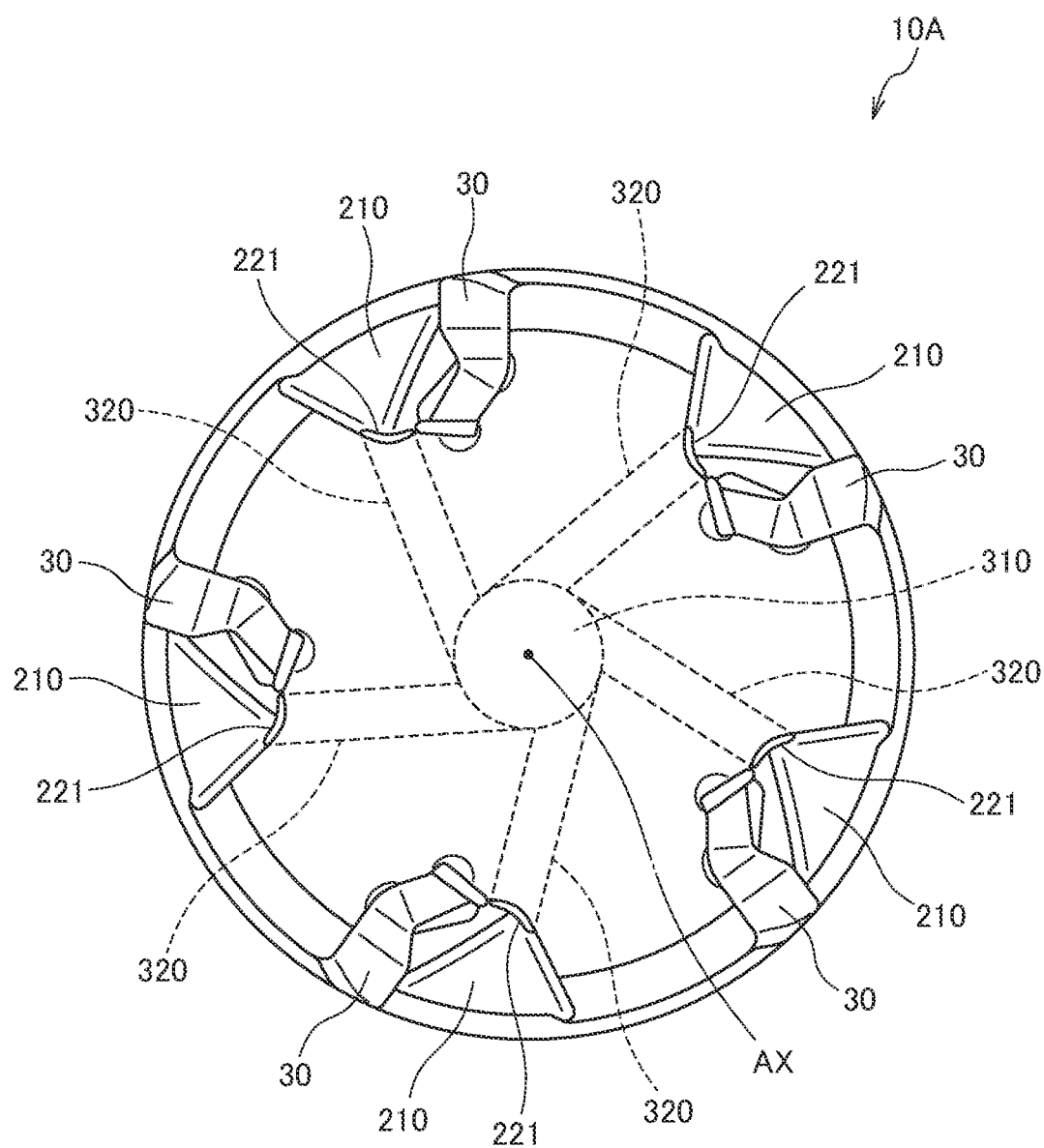
FIG. 9 is a view illustrating a configuration of the cutting tool according to the comparative example.

As described above, the first channels 310 are each formed such that its center axis is decentered so as not to match the rotational center axis AX, and are formed so as to surround the rotational center axis AX with the same angular intervals. To describe advantages of such a configuration, a configuration of a cutting tool 10A according to a comparative example is described. FIG. 8 illustrates the appearance of the cutting tool 10A from the same viewpoint as in FIG. 3. FIG. 9 illustrates the appearance of the cutting tool 10A from the same viewpoint as in FIG. 2.

The cutting tool 10A is configured as an endmill of precision machining type in which the cutting inserts 30 are provided only at the first stage on the leading end side. Also in the comparative example, a first channel 310 and second channels 320 are formed inside the cutting tool 10A.

However, the first channel 310 in the comparative example is not formed at a decentered position unlike the present embodiment, but is formed such that its center axis matches the rotational center axis AX, that is, its center axis passes through the center of the grip part 100. As illustrated in FIG. 9, each second channel 320 is formed so as to linearly extend from the first channel 310 located at the center toward chip pockets 210 on the outer side.

In such a configuration, if the outflow port 221 is provided near the cutting insert 30 (for example, position adjacent to cutting insert 30 along circumferential direction), the direction in which fluid is discharged from the second channel 320 is out of the cutting insert 30. Fluid discharged from the second channel 320 does not directly contact the cutting insert 30, in particular, the vicinity of the cutting edge, and hence the function of fluid is not sufficiently exhibited, and there is a problem in that the lifetime of the cutting insert 30 decreases.

Figure 10:
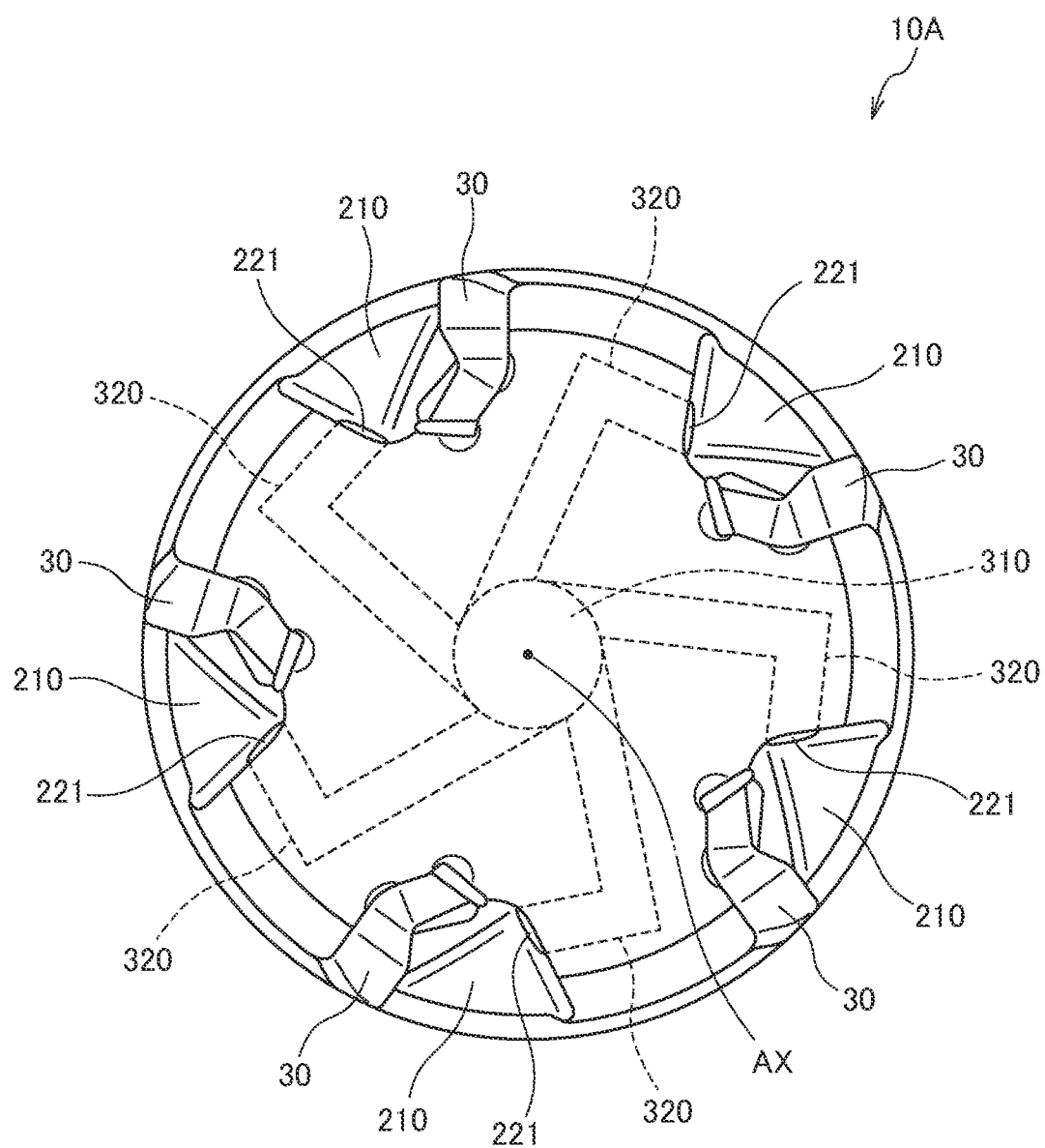
FIG. 10 is a view illustrating a configuration of the cutting tool according to the comparative example.

To solve such a problem, for example, as in an example illustrated in FIG. 10, it is conceivable that the second channel 320 is formed so as to be bent in the middle such that a downstream part is directed to the cutting insert 30. In such a configuration, however, the shape of the second channel 320 becomes complicated, and drilling needs to be performed a plurality of times, with the result that manufacturing cost may increase. In this case, an opening is formed at a part different from an inlet and an outlet for fluid, and hence the opening needs to be filled, and manufacturing cost further increases. Furthermore, in a configuration in which the second channel 320 is greatly bent, there is a problem in that channel resistance increases.

On the other hand, in the cutting tool 10 in the present embodiment illustrated in FIG. 7, each of the second channels 320 is formed so as to extend toward the cutting insert 30, and the first channel 310 is formed at an upstream end part of the second channel 320. As a result, each of the first channels 310 is disposed at a position decentered from the rotational center axis AX.

Figure 11:
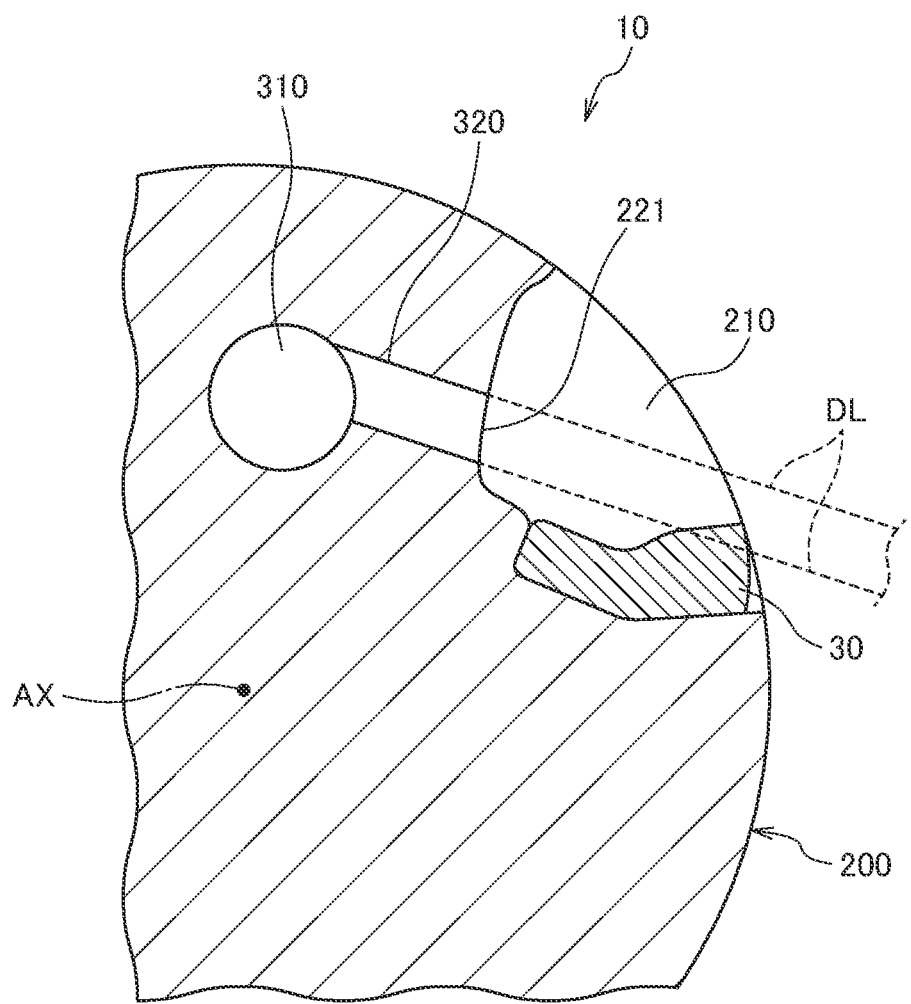
FIG. 11 is a view illustrating a configuration of the cutting tool according to the first embodiment.

FIG. 11 schematically a part of a cross section of the cutting part 200 cut perpendicularly to the rotational center axis AX. Dotted lines DL illustrated in FIG. 11 indicate an outward extension of a direction in which the second channel 320 linearly extends, and indicate a direction in which fluid that has passed through the second channel 320 is ejected from the outflow port 221. As illustrated in FIG. 11, it is preferred that the second channel 320 be formed in such a direction that a part of the cutting insert 30 enters the inner side of the range indicated by the dotted lines DL. In other words, it is preferred that the second channel 320 be formed in such a direction that at least at part of ejected fluid directly contacts a part of the cutting insert 30. It is further preferred that "a part of the cutting insert 30" be a part of the cutting edge of the cutting insert 30.

Figure 12:
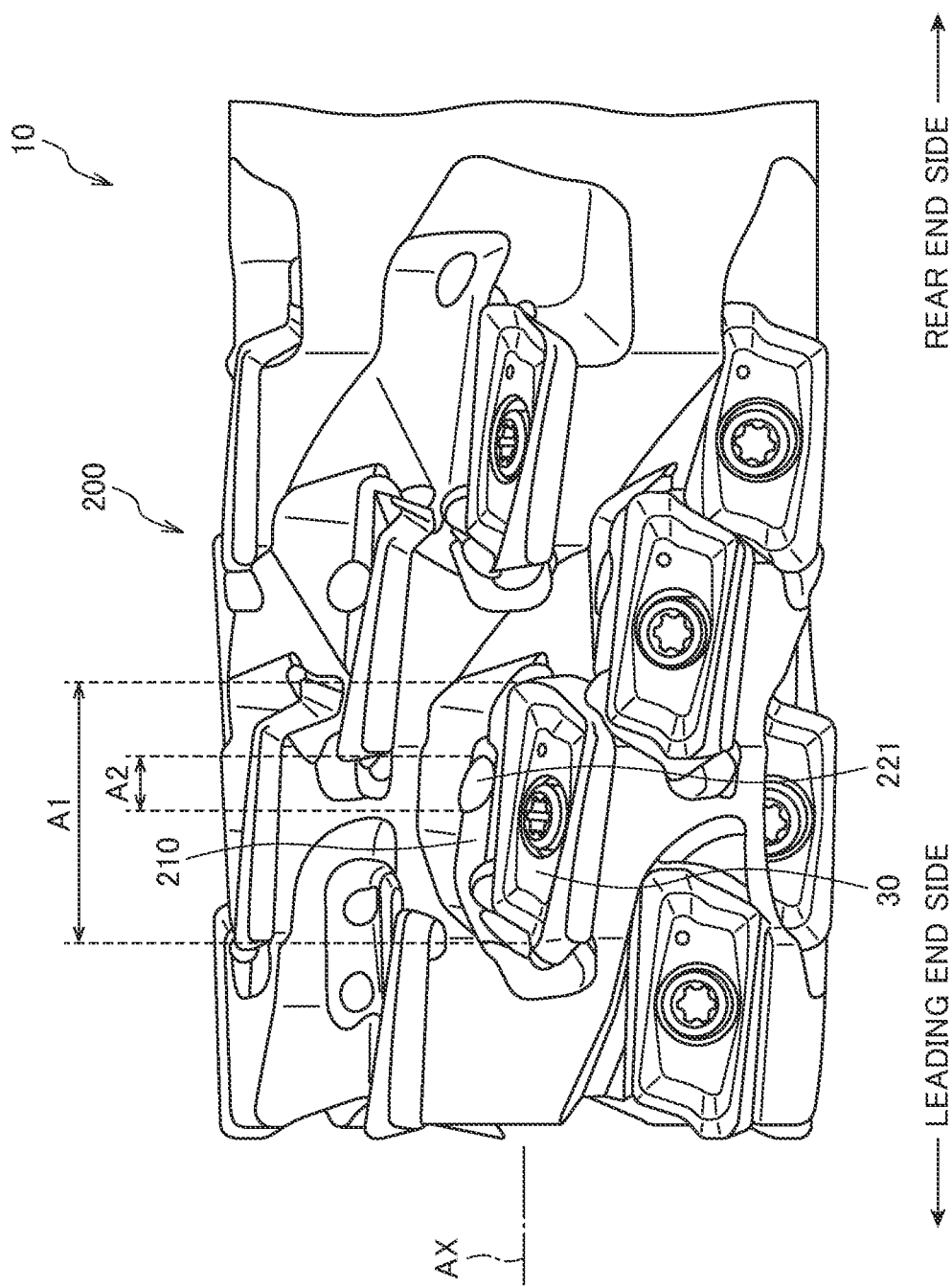
FIG. 12 is a view for describing a positional relation between an outflow port and a cutting insert in the cutting tool according to the first embodiment.

FIG. 12 is an enlarged view of the cutting part 200 in FIG. 3. Description is now given focusing on the cutting insert 30 denoted by reference numeral "30" and the outflow port 221 denoted by reference numeral "221" in FIG. 12. The cutting insert 30 and the outflow port 221 are provided at the same chip pocket 210.

A range A1 illustrated in FIG. 12 indicates a range where the cutting insert 30 is provided in a direction along the rotational center axis AX. A range A2 illustrated in FIG. 12 indicates a range where the outflow port 221 is formed in a direction along the rotational center axis AX. In the present embodiment, the entire range A2 is included in the range A1. In other words, the position of the outflow port 221 in the direction along the rotational center axis AX is a position overlapping the range A1 where the cutting insert 30 is provided in that direction.

If the outflow port 221 is provided at a position on a rear end side of the range A1 where the cutting insert 30 is provided, fluid is ejected from the outflow port 221 in a state in which components of velocity toward the leading end are large, and is supplied toward the cutting insert 30 on the leading end side. In this case, the direction in which fluid flows and the direction in which chips are discharged are opposite to each other, and hence the discharge of chips is blocked by the flow of fluid, and jamming due to chips may occur.

In the present embodiment, on the other hand, the outflow port 221 is provided at a position overlapping the range A1 as described above, and hence fluid is ejected from the outflow port 221 in the state in which velocity components toward the leading end are small, and is supplied toward the cutting insert 30 on the leading end side. Thus, a phenomenon that the discharge of chips is blocked by the flow of fluid is difficult to occur. Note that the outflow port 221 may be formed at such a position that the entire outflow port 221 is included inside the range A1 as in the present embodiment. Alternatively, the outflow port 221 may be formed at such a position that only a part of the outflow port 221 is located inside the range A1.

The same positional relation between the outflow port 221 and the cutting insert 30 is applied to all other outflow ports 221.

Other configurations are described. As illustrated in FIG. 4, a single recessed part 110 is formed at the rearmost end part of the grip part 100 so as to be retracted toward the cutting part 200, and the three inflow ports 121 described above are formed inside the recessed part 110.

Machine tools capable of supplying fluid to channels inside the cutting tool are configured such that fluid is suppled from the center of the cutting tool in many cases. Thus, when the first channel 310 is formed at a position decentered from the rotational center axis AX as in the present embodiment, the position at which fluid is supplied from the machine tool and the position of the first channel 310 do not match each other, and hence there is a fear in that fluid does not smoothly flow into the inflow port 121.

In view of the above, in the cutting tool 10 according to the present embodiment, the recessed part 110 is provided as described above. In such a configuration, fluid supplied from a machine tool along the rotational center axis AX first flows to the inside of the recessed part 110, subsequently passes through the corresponding inflow port 121, and is distributed to the first channels 310 smoothly. Thus, the above-mentioned problem caused by the configuration in which the first channel 310 is formed at a decentered position does not occur.

The range where the recessed part 110 is formed only needs to be a range that includes the rotational center axis AX at least on its inner side. The entire inflow port 121 may be formed in a range overlapping the recessed part 110 as in the present embodiment, but the inflow port 121 may be formed at a position at which only a part of the inflow port 121 overlaps the recessed part 110. Furthermore, the inflow port 121 that is formed in a range where the entire inflow port 121 overlaps the recessed part 110 and the inflow port 121 that is formed at a position at which only a part of the inflow port 121 overlaps the recessed part 110 may be mixed.

A second embodiment is described. In the following, differences from the first embodiment are mainly described, and descriptions of parts common to the first embodiment are omitted as appropriate.

Figure 13:
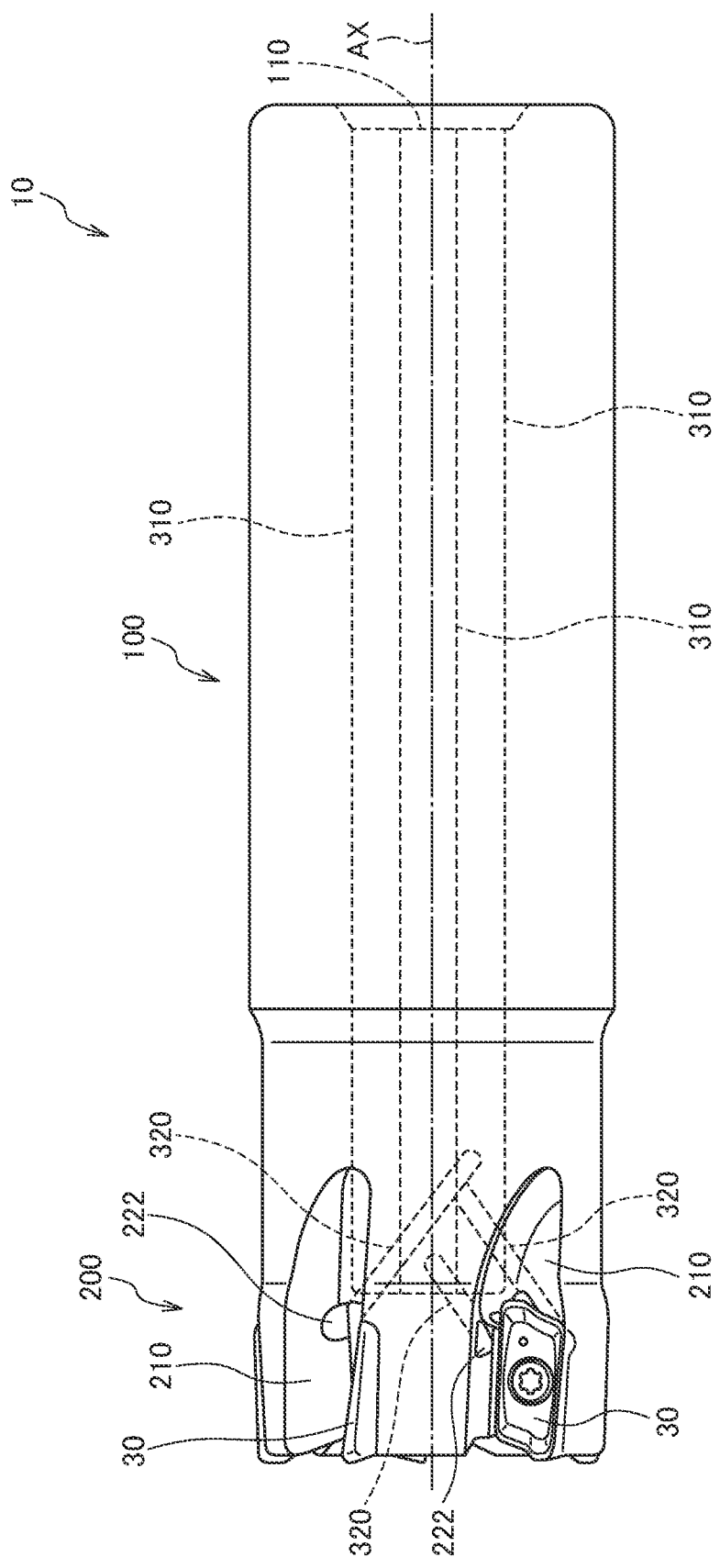
FIG. 13 is a view illustrating a configuration of a cutting tool according to a second embodiment.

FIG. 13 illustrates the appearance of the cutting tool 10 according to the present embodiment from the same viewpoint as in FIG. 3. As illustrated in FIG. 13, similarly to the comparative example in FIG. 8, the cutting tool 10 according to the present embodiment is configured as an endmill of precision machining type in which the cutting inserts 30 are provided only at the first stage on the leading end side.

Also in the present embodiment, the three first channels 310 are linearly formed similarly to the first embodiment. Each of the first channels 310 is formed such that its center axis is decentered so as not to match the rotational center axis AX. Also in the present embodiment, the second channel 320 is linearly formed so as to extend from the first channel 310 toward the cutting insert 30. Specific shapes and arrangement of the first channels 310 and the second channels 320 are the same as the shapes and arrangement illustrated in FIG. 7. In this manner, the configuration of the first channels 310 described in the first embodiment is also applicable to various cutting tools other than roughing type cutting tools, and the same effects as in the first embodiment can be obtained.

In the above, an example of the configuration in which the cutting edge of the cutting tool 10 is provided to the cutting insert 30 such that the cutting edge is replaceable has been described. However, for example, the configuration of the channels described above is also applicable to a cutting tool configured such that a cutting edge is brazed to the cutting tool 10 and the cutting edge is unreplaceable.

The embodiments have been described above with reference to specific examples. However, the present disclosure is not limited to the specific examples. Design changes appropriately added to the specific examples by a person skilled in the art are included in the scope of the present disclosure as long as the features of the present disclosure are included. The components in each of the above-mentioned specific examples, the arrangement, conditions, and shapes thereof are not limited to the exemplified ones, and can be changed as appropriate. The combinations of the components in each of the above-mentioned specific examples can be changed as appropriate unless technical conflict occurs.

What is claimed is:

1. A cutting tool, comprising:
a columnar grip part defining a rotational center axis of the cutting tool;
a cutting part comprising:
a plurality of stage positions along the rotational center axis, each of the plurality of stage positions having:
a plurality of recessed chip pockets, and
a plurality of cutting inserts, each cutting insert disposed on a respective one of the plurality of recessed chip pockets, wherein the plurality of cutting inserts are arranged along a circumferential direction,
a channel system comprising:
an inflow port formed in the grip part,
a plurality of first channels extending in parallel to the rotational center axis and linearly from an end part of the grip part on an opposite side to the cutting part; and
a plurality of second channels extending linearly from at least one of the first channels toward the plurality of cutting inserts, wherein each of the second channels includes an outflow port formed in a vicinity of a respective one of the plurality of cutting inserts,
the at least one first channel includes a center axis decentered from the rotational center axis, and
a number of first channels is smaller than a number of the plurality of cutting inserts arranged along the circumferential direction at one of the plurality of stage positions along the rotational center axis.

2. The cutting tool according to claim 1, wherein the plurality of second channels are connected to the at least one first channel such that fluid is passed through the at least one first channel and supplied to the plurality of cutting inserts.

3. The cutting tool according to claim 1, wherein
a single recessed part is formed at an end part of the grip part on an opposite side to the cutting part, and
the inflow port is an inlet for fluid to the at least one first channel and formed in the recessed part.

4. The cutting tool according to claim 3, wherein the recessed part is formed around the rotational center axis.

5. The cutting tool according to claim 1, wherein the plurality of second channels are connected to the at least one first channel such that fluid is passed through the at least one first channel and supplied toward the plurality of cutting inserts located at the plurality of the stage positions.

6. The cutting tool according to claim 1, wherein
each outflow port is an outlet for fluid passed through a respective second channel, each outflow port is formed in an inner surface of a respective recessed chip pocket, and
a respective position of each outflow port in a direction along the rotational center axis is located within a range where a respective cutting insert is provided in the direction along the rotational center axis.

\* \* \* \* \*